G. W. ROWE & G. A. HOWARD.
COMPOSITION OF MATTER.
APPLICATION FILED JULY 30, 1908.
937,869.
Patented Oct. 26, 1909.
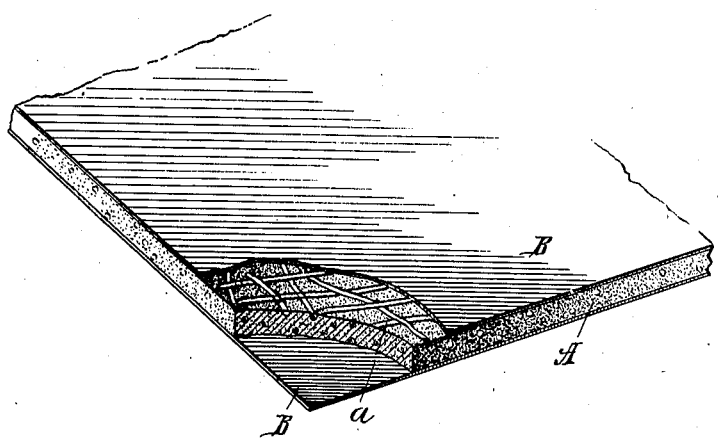
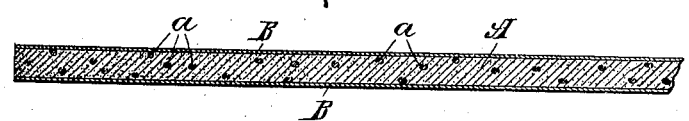

UNITED STATES PATENT OFFICE.

GEORGE W. ROWE AND GUY A. HOWARD, OF HAMPTON, VIRGINIA.

COMPOSITION OF MATTER.

937,869.　　　　Specification of Letters Patent.　　Patented Oct. 26, 1909.

Application filed July 30, 1908.　Serial No. 446,042.

*To all whom it may concern:*

Be it known that we, GEORGE W. ROWE and GUY A. HOWARD, citizens of the United States, and residents of Hampton, in the county of Elizabeth City and State of Virginia, have made and invented certain new and useful Improvements in Composition of Matter, of which the following is a specification.

Our invention relates to an improved material or composition from which to manufacture plaster boards, boxes, and other plaster products, the object of the same being to provide such a composition as will insure to the articles made therefrom, lightness, toughness, strength and durability.

With these and other ends in view, our composition designed for use as above consists of the following ingredients combined in substantially the proportions stated, viz: Calcined plaster 75 per cent., corn cobs shredded, 20 per cent., glue 2½ per cent., alum 2½ per cent. The body of the composition or material, of course, is largely composed of the calcined plaster, thoroughly mingled with which is the shredded corn cobs. The latter acts as a binder for the plaster, in order to hold the particles thereof together, and being exceedingly light, reduces the weight of the finished article. Furthermore, this material is exceedingly cheap, and by reason of its roughened or irregular surfaces, affords an excellent binding means for the body of the material, insuring to the finished board a great amount of strength and toughness, permitting, as we have found by experiment, nails to be driven through the composition or article formed therefrom with little or no danger of cracking or injury.

The alum and glue thoroughly combine with the plaster when the parts are mixed with water, the alum tending to harden the composition and lend additional strength thereto, the glue assisting the shredded corn cobs in acting as a binder for the particles of the plaster filler.

For the purpose of holding the parts together, should the composition or material become broken or cracked, we may employ intermeshed string, twine, or hemp fibers, completely embedded in the composition, as we have found in practice that the use of such is a material advantage therein.

While, of course, we prefer to employ the alum and glue in the manufacture of the compositions as above described, as and for the purposes set forth, yet we would have it understood that such are not absolutely necessary, as we have found that the material consisting of calcined plaster and shredded corn cobs may be employed with good results.

The foregoing materials are of course, thoroughly mixed with the requisite amount of water to render the same plastic, and while in such condition, may be pressed, rolled, or otherwise formed into sheets or boards. If desired, the outer surfaces thereof may be covered by paper, as is usually done in the case of the plaster boards now in common use, and as shown in the accompanying drawings, in which—

Figure 1 is a view in perspective of a piece of plaster or composition board constructed in accordance with my invention, one corner thereof being broken away for the sake of clearness. Fig. 2 is a sectional view thereof.

In the drawings, A represents the body thereof, formed of the materials or ingredients as above set forth, and containing intermeshed string or twine $a$, B—B representing paper covering the outer sides or surfaces thereof.

While the board formed as above described, may be used with good effects without the paper, yet we prefer to use the same, as it not only lends additional strength thereto, but also gives to the article a neat and finished appearance.

It will of course be understood that our invention is not in any way restricted to the article or articles into which the composition may be rolled, pressed, or otherwise formed, the gist of our invention lying in the composition containing the ingredients, and in substantially the proportions named.

Having fully described our invention, what we claim as new and desire to secure by Letters Patent, is:—

1. The material hereinabove described and containing calcined plaster and shredded corn cobs.

2. The composition hereinabove described containing calcined plaster, intermeshed twine and shredded corn cobs.

3. A composition of matter, consisting of calcined plaster, shredded corn cobs, alum and glue, in substantially the proportions named.

Signed at Hampton in the county of Elizabeth City and State of Virginia this 23d day of July A. D. 1908.

GEORGE W. ROWE.
GUY A. HOWARD.

Witnesses:
R. C. WINNE,
W. W. LACKEY.